(12) United States Patent
Pellegatti et al.

(10) Patent No.: US 6,696,520 B1
(45) Date of Patent: Feb. 24, 2004

(54) SOFT ELASTOMERIC THERMOPLASTIC POLYOLEFIN COMPOSITIONS

(75) Inventors: Giampaolo Pellegatti, Baure (IT); Vittorio Braga, Ferrara (IT); Roberto Bonari, Cerro Maggiore (IT)

(73) Assignee: Basell Poliolefine Italia S.p.A., Hoofddorp (NL)

( * ) Notice: Subject to any disclaimer, the term of this patent is extended or adjusted under 35 U.S.C. 154(b) by 0 days.

(21) Appl. No.: 09/172,959

(22) Filed: Oct. 14, 1998

Related U.S. Application Data

(63) Continuation of application No. PCT/EP98/00859, filed on Feb. 16, 1998.

(30) Foreign Application Priority Data

Feb. 21, 1997 (EP) .............................. 97200530

(51) Int. Cl.$^7$ ............................... C08L 53/00
(52) U.S. Cl. ............................ 525/88; 525/95; 525/99; 525/206; 525/240
(58) Field of Search ................... 525/240, 88, 95, 525/97, 206

(56) References Cited

U.S. PATENT DOCUMENTS

| | | | | |
|---|---|---|---|---|
| 4,143,099 A | * | 3/1979 | Duncan | |
| 4,220,579 A | * | 9/1980 | Rinehart | 524/525 |
| 4,313,867 A | * | 2/1982 | Duvdevani | 524/399 |
| 4,871,796 A | * | 10/1989 | Komatsu et al. | 524/474 |
| 5,480,942 A | | 1/1996 | Addeo et al. | |
| 5,747,592 A | * | 5/1998 | Huff et al. | 525/191 |
| 5,824,400 A | * | 10/1998 | Petrakis et al. | 428/218 |

FOREIGN PATENT DOCUMENTS

| | | |
|---|---|---|
| DE | 4211413 A1 | 10/1993 |
| EP | 457 082 A1 | 4/1991 |
| EP | 472 946 A2 | 3/1992 |
| EP | 611 801 A1 | 8/1994 |
| EP | 633289 * | 1/1995 |
| WO | WO 92/22607 * | 12/1992 |
| WO | WO 96/22327 | 7/1996 |

* cited by examiner

Primary Examiner—Jeffrey Mullis
(74) Attorney, Agent, or Firm—Bryan Cave LLP

(57) ABSTRACT

An elastomeric thermoplastic polyolefin composition comprising (i) an heterophasic olefin polymer composition comprising a crystalline propylene homopolymer of copolymer fraction and an elastomeric ethylene copolymer fraction and (ii) an elastomeric polymer having a hardness equal to or less than 90 points selected from the group consisting of copolymers of ethylene, ethylene-methyl acrylate copolyers, saturated or unsaturated styrene block copolymers and unsaturated norbornene polymers.

9 Claims, No Drawings

SOFT ELASTOMERIC THERMOPLASTIC POLYOLEFIN COMPOSITIONS

This is a continuation of PCT International Application No. PCT/EP98/00859, filed Feb. 16, 1998.

The present invention relates to an elastomeric thermoplastic polyolefin composition having a good softness and workability.

The composition of the present invention can be used in any process wherein elastomeric thermoplastic polyolefin compositions are needed. In particular, the composition of the present invention is suitable for being used in injection and co-injection moulding, blow-moulding and extrusion processes.

A number of physical and mechanic properties of the composition of the present invention, in particular the opaque appearance and softness, makes such composition particularly suitable for the production of manufactured articles having a good soft-touch feeling. Typical articles produced with the composition of the present invention are synthetic leathers (such as extruded films and sheets or extruded profiles) and shaped articles (such as soles for shoes). The main uses of articles having said features are in the vehicle field, in particular, to produce internal parts of vehicles.

Polymers and copolymers suitable for production of manufactured articles by injection, co-injection moulding and sequential injection moulding processes are already known. Such compositions are described in U.S. Pat. No. 5,480,942 (Spherilene) and patent application WO 96/22327 (Commer), for instance. Both the documents describe olefin polymers grafted with polyalkenylenes, in particular polyoctenylenes. The process for the preparation of said grafted polymers comprises the use of radical initiators.

Manufactured articles prepared from the polymers of above-mentioned prior art are transparent and have a bright appearance (namely, high gloss values). Contrary to this, at present it is requested that manufactured articles used to coat internal parts of vehicles be opaque.

Moreover, although the cited compositions are soft, they do not meet the present requirements entirely, as to meet them it is necessary to produce soft compositions.

Finally, the above-mentioned prior art compositions have the drawback of showing a marked stickiness, badly affecting the aesthetic appearance.

To overcome the drawbacks of the known polymers and meet the said requirements, now a new composition has been found which has higher softness and less stickiness.

Besides, the manufactured articles produced with the composition of the present invention are opaque.

Another advantage given by the composition of the present invention concerns the good workability of the composition in a broad range of temperatures. One does not observe a meaningful variation of the proprieties of the compositions in such range, with particular reference to the surface reproducibility, i.e. a good and constant quality of the embossing or roughness, planarity of the moulded surface and absence of the stickiness even after ageing.

A further advantage of the composition of the present invention is that it has good softness even in the absence of the extender oil. As well known the extender oil can be released by the composition containing it as time passes and cause pollution and fogging. Moreover, articles obtained by the composition containing extender oils can become gloss and greasy because of the emergence of said oil.

Therefore, an object of the present invention is an elastomeric thermoplastic polyolefin composition comprising (percent by weight):

(I) 40–97%, preferably 45–95%, of a heterophasic olefin polymer composition comprising:
   (A) 5–50%, preferably 10–40%, of a crystalline propylene homopolymer with isotactic index greater than 80%, preferably from 85 to 90%, or crystalline copolymer of propylene and ethylene or a $CH_2=CHR$ α-olefin, wherein R is a $C_2–C_8$ alkyl radical, or crystalline copolymer of propylene, ethylene and a $CH_2=CHR$ α-olefin, wherein R is a $C_2–C_8$ alkyl radical, or blend thereof; said copolymers containing more than 85% of propylene and having an isotactic index greater than 80%;
   (B) 0–20%, preferably 0–15%, of a crystalline copolymer fraction of ethylene with propylene or with a $CH_2=CHR$ α-olefin, wherein R is a $C_2–C_8$ alkyl radical, or both propylene and said alpha-olefin, said fraction being insoluble in xylene at ambient temperature, i.e. 25° C.; and
   (C) 40–95%, preferably 50–75%, of an elastomeric copolymer fraction of ethylene with propylene or with a $CH_2=CHR$ α-olefin, wherein R is a $C_2–C_8$ alkyl radical, or both propylene and said alpha-olefin, and optionally with minor amounts of a diene, said copolymer fraction containing ethylene in an amount smaller than 40%, preferably from 20 to 38%, and being soluble in xylene at ambient temperature;
(II) 3–60%, preferably 5–55%, of an elastomeric polymer having a hardness (Shore A, ASTM D-2240) equal to or less than 90 points, preferably equal to or less than 88 points, more preferably equal to or less than 75 points, selected from the group consisting of:
   1 copolymers of ethylene with a $C_3–C_{10}$ α-olefin containing at least 20 wt %, preferably from 20 to 70 wt %, of $C_3–C_{10}$ α-olefin ($^{13}$C-NMR analysis) and having a Mw/Mn ratio less than 4, preferably less than 3;
   2 ethylene-methyl acrylate copolymers containing from 15 to 30 wt % of methyl acrylate units and having MFR from 1 to 10 g/10 min (ASTM D-1238);
   3 saturated or unsaturated styrene block copolymers, linear or branched, containing at least one comonomer selected from butadiene, butylene, ethylene and isoprene; and
   4 unsaturated norbornene polymers having a molecular weight over 3,000,000.

Examples of heterophasic olefin polymer composition (I) are described in published European patent application EP-A-0472946 (Himont Inc.), the content of which is incorporated herein by reference.

As a way of example the total amount of ethylene in heterophasic olefin polymer composition (I) is 15 to 35% by weight. Besides, the intrinsic viscosity of fraction (C) generally is 1.5 to 4 dl/g.

Preferably the propylene content in copolymers of fraction (A) is 90 to 99% by weight. The isotactic index is determined as the insoluble fraction in xylene at 25° C. (see note 1 below).

Preferably the amount of ethylene in fraction (B) is at least 75% by weight, more preferably at least 80% by weight, with respect to the total weight of (B). Preferably the copolymer is an essentially linear copolymer of ethylene with propylene, such as a linear low density polyethylene (LLDPE).

Examples of $CH_2=CHR$ α-olefin, wherein R is a $C_2–C_8$ alkyl radical, that can be present in heterophasic polymer composition (I) are 1-butene, 1-pentene, 4-methyl-1-pentene, 1-hexene and 1-octene.

When present, the diene units in fraction (C) of (I) are preferably in an amount from 1% to 10% by weight with respect to the total weight of (C). Examples of dienes are butadiene, 1,4-hexadiene, 1,5-hexadiene and ethylene-1-norbornene.

The above-mentioned heterophasic olefin polymer composition (I) can be prepared by melt blending fractions (A), (B) and (C) in the fluid state, that is at temperatures higher than their softening or melting point, or by sequential polymerization in two or more stages in the presence of a highly stereospecific Ziegler-Natta catalyst. In particular the catalyst system comprises (i) a solid catalyst component containing a titanium compound and an electron-donor compound both supported on a magnesium halide and (ii) an Al-trialkyl compound and an electron-donor compound.

Examples of sequential polymerization processes are described in published European patent application EP-A-0 472 946. When heterophasic olefin polymer composition (I) is prepared by sequential polymerization, fraction (B) is present in an amount greater than or equal to 1% by weight. When said fraction (B) is present, it is preferable that the (B)/(C) weight ratio be less than 0.4, in particular from 0.1 to 0.3. It is also preferable that the weight percent of fraction (C), or of the sum of fractions (B) and (C), be from 50 to 90%, preferably from 65 to 80%, with respect to heterophasic olefin polymer composition (I).

Heterophasic olefin polymer composition (I) has preferably Melt Flow Rate (MFR) (according to ASTM D 1238, condition L) values generally comprised in the range from 0.1 to 100 g/10 min, preferably from 0.2 to 50 g/10 min. Heterophasic olefin polymer composition (I) having said values of MFR can be obtained directly during the polymerization process; otherwise heterophasic olefin polymer composition (I) can undergo a visbreaking process carried out in the presence of visbreaking agents, such as peroxides. The said visbreaking process is carried out according to well-known methods.

Preferably polymers 1 having the cited $\overline{Mw}/\overline{Mn}$ ratio are obtained directly by the polymerization process, i.e. in the absence of chemical visbreaking, by peroxides for instance. Polymers 1 can be prepared with metallocene catalysts, for example.

Preferred examples of elastomeric polymers 1 are:
(a) elastomeric copolymers of ethylene with 1-octene having from 20 wt % to 40 wt % of 1-octene ($^{13}$C-NMR analysis); preferably having density of less than 0.89 g/ml;
(b) elastomeric thermoplastic copolymers of ethylene with 1-butene having from 20 wt % to 40 wt % of 1-butene ($^{13}$C-NMR analysis); preferably having density of less than 0.89 g/ml;

Preferred examples of elastomeric copolymers 2 are:
(c) ethylene-methyl acrylate copolymers containing about 20–25 wt % of methyl acrylate units and having MFR form 1.5 to 6 g/10 min.

Preferred examples of elastomeric copolymers 3 are:
(d) unsaturated linear block copolymers of styrene with isoprene or butadiene and saturated linear block copolymers of styrene with ethylene and butylene.

The copolymers of groups 1 to 3 are preferred. In particular copolymers (a) and (b) are more preferred, more particularly copolymers (a) are the most preferred.

A specific example of copolymers (a) is a copolymer containing 66 wt % of ethylene and 34 wt % of 1-octene ($^{13}$C-NMR analysis, see note 2 below), having a hardness of 75 Shore A points, a MFR of 10 g/10 min and a density of 0.87 g/ml according to method ASTM D 792.

Another specific example of copolymers (a) is a copolymer containing 75 wt % of ethylene and 25 wt % of 1-octene (IR analysis), having a hardness of 75 Shore A points and a density of 0.87 g/ml according to method ASTM D 792 and MFR of about 1 g/10 min.

A specific example of copolymers (b) is a copolymer containing 77.9 wt % of ethylene and 22.1 wt % of 1-butene ($^{13}$C-NMR analysis, see note 2 below) having a hardness of 85 Shore A points and a density of 0.87 g/ml according to method ASTM D 792.

A specific example of copolymers (c) is an ethylene-methyl acrylate copolymer containing 20 wt % of methyl acrylate, having a MFR of 1.5–2.5 g/10 min, a hardness of 89 Shore A points and a density of 0.945 g/ml according to method ASTM D 792.

Specific example of copolymers (d) are styrene-isoprene-styrene block copolymers (SIS), commercialised as Kraton D-1112, having a hardness of 34 Shore A points; styrene-ethylene-butylene-styrene block copolymers (SEBS), marketed as Kraton G-1652, having a hardness of 75 Shore A points; and styrene-ethylene-butylene-styrene block copolymers (SEBS), marketed as Kraton G-1657, having a hardness of 65 Shore A points. They all are commercialised by Shell.

A specific example of polymer 4 is the one having a molecular weight over 3,000,000; it is marketed by Nippon Zeon Co. LTD with the trademark Norsorex N.

The compositions of the present invention can also contain various additives generally used in the polymeric thermoplastic compositions, such as stabilizers, anti-oxidizing agents, anti-corrosion agents, anti-UV agents, carbon black, pigments, plasticizers and so on. Furthermore, the compositions according to the present invention can contain additives, flame retardants and fillers, such as mineral fillers, capable of giving particular properties to the articles for the manufacture of which the compositions are made.

The compositions of the present invention can be prepared by blending the components in an apparatus equipped with mixing elements, such as an internal mixer or extruder. For example one can use a Banbury mixer or single-screw Buss extruder or twin-screw Maris or Werner type extruder.

The composition of the present invention can be prepared in one or more stage(s). The order of mixing of the components is not relevant. The visbreaking of heterophasic olefin polymer composition (I) through visbreaking agents can be carried out in the presence of elastomeric polymer (II), and optionally other additives, as well as before adding elastomeric polymer (II) or after the addition thereof.

The compositions of the invention are generally obtained in form of pellets. These can be transformed into shaped manufactured articles by known injection, co-injection moulding, sequential injection moulding and blow moulding processes and transformed into laminates, which include films and laminates, by extrusion.

Generally speaking, preferably, the compositions of the present invention suitable for injection moulding processes have values of MFR ranging about from 2 to 100 g/10 min, preferably from 2 to 50 g/10 min. The compositions having lower values of MFR, such as from 0.1 to 2 g/10 min, preferably from 0.2 to 2 g/10 min, are suitable for extrusion processes.

The following examples are given to illustrate, but not limit the present invention.

The method used to obtain the property data reported in the examples and description are identified below.

| Property | Method |
|---|---|
| Melt Flow Rate | ASTM D-1238, condition L |
| Intrinsic viscosity | Determined in tetrahydro-naphthalene at 135° C. |
| Xylene soluble fraction | (see note 1 below) |
| Determination of C content | $^{13}$C-NMR analysis (see note 2 below) |
| Hardness (Shore D) | ASTM D-2240 |
| Hardness (Shore A) | ASTM D-2240 |
| Gloss | (see note 3 below) |
| Stickiness | (see note 4 below) |
| Blooming | (see note 5 below) |
| Coefficient of friction (COF) | ASTM D-1894, condition C (see note 6 below) |
| Roughness | DIN 4768 (see note 7 below) |
| Planarity | ASTM D-4771 (see note 8 below) |
| Elongation at break | ASTM D-638 |
| Tensile at break | ASTM D-638 |
| Tension set 100% at 23° C. | ASTM D 412, cut according to method ASTM D 638 |

Note 1
Determination of the percent of xylene soluble fraction: a solution of the sample in xylene at a concentration of 1% by weight is prepared and kept at 135° C. for one hour while stirring. The solution is allowed to cool to 95° C., while stirring, after which it is kept for 20 minutes without stirring, and for 10 minutes under stirring. The solution is then filtered, and acetone is added to an aliquot of the filtrate to cause the polymer dissolved therein to precipitate. The polymer thus obtained is recovered, washed, dried, and weighed to determine the weight of xylene soluble fraction.
Note 2
The analysis were carried out with an instrument Bruker AC200 at 50323 Mhz, using $C_2D_2Cl_4$ as solvent at temperature of 120° C.
Note 3
Said test is carried out on plaques produced by an injection-moulding process in an automated injection press. The operative conditions are: melt temperature is 220° C., mould temperature is 40° C. and backpressure is 10 bar. The dimensions of the plaques are 175 × 74 × 3 mm. The gloss is measured on the smooth side of the plaques immediately after moulding and then after 30 days' ageing in an oven at 70° C. The gloss is determined as below described. One measures the light reflected by the surface of the plaque under test. The light ray has a fixed angle of incidence. The following simplified equation of Fresnel, which is suitable for non-metals, is used: $F = 1/2 \; [sen^2(i - r)/sen^2(i + r) + tg^2(i - r)/tg^2(i + r)] = I/I0$ wherein F = fraction of the measured light rays; I = emerging rays; I0 = incidental rays; i = angle of incidence; r = angle of refraction; sen r = (sen i)/n, wherein n = refractive index. The used instrument is a photometer Zhentner 2GM 1020 suitable for angles of 45°/60°.
The gloss is given as average value.
Note 4
Injected moulding plaques prepared as in note 3 and having the same dimensions are used. The stickiness is measured after 6 months' ageing at room temperature. The different stickiness of the plaques is determined by a tactile test of the operator. The scale of stickiness is explained in Table 1.
Note 5
One determines the variation in the time of the gloss of an injection moulded plaque, prepared as described in note 3. The plaque has dimensions of 175 × 74 × 3 mm. The gloss is immediately after preparing the plaque and after 30 days' ageing in an oven at 70° C.
Note 6
Said test was carried out on moulded plaques prepared as in note 3. The dimensions of the plaques were 150 × 250 × 3.2 mm. According to the above-mentioned method ASTM D-1894, version C, to determine the coefficient of fraction (COF) one makes to slip a metallic slide on the smooth part of the moulded plaque. The metallic slide is prepared according to method DIN 4768. The COF has been determined both on plaques moulded at low temperature of the melt (220° C.) and on plaques moulded at high temperature of the melt (260° C.) both before and after ageing in an oven at 100° C. for 3 days.
Note 7
One determines the mean "peak-to-valley height" of 5 consecutive individual measuring lengths of the filtered roughness profile of the embossed plaque.
Note 8
One measures the deformation of a plaque produced by injection moulding both before ageing and after ageing in an oven at 100° C. for 3 days.

COMPONENTS USED IN THE EXAMPLES AND COMPARATIVE EXAMPLE

Heterophasic composition (I) having MFR of 0.6–1 g/10 min consists of (percent by weight):
(A) 33% of a crystalline random copolymer of propylene and 4.3% of ethylene; the copolymer contains about 9% of a soluble fraction in xylene at 25° C. and has an intrinsic viscosity [ ] of 1.5 dl/g;
(B) 6% of an essentially linear ethylene/propylene copolymer wholly insoluble in xylene at 25° C.; and
(C) 61% of an ethylene/propylene amorphous copolymer, containing 30% of ethylene; the copolymer is wholly soluble in xylene at 25° C. and has an intrinsic viscosity [η] of 3.2 dl/g.

The composition was obtained by sequential polymerization in the presence of a high yield and highly stereospecific Ziegler-Natta catalyst, supported on $MgCl_2$.

copolymer containing 66 wt % of ethylene and 34% by weight of 1-octene (NMR analysis), having a hardness of 75 Shore A points and a density of 0.87 g/ml. It is marketed by Dow Chemical with the trademark Engage 8200;

copolymer containing 75 wt % of ethylene and 25% by weight of 1-octene (IR analysis according to Dow Chemical), having a hardness of 75 Shore A points and density of 0.868 g/ml. It is marketed by Dow Chemical with the trade-mark Engage 8150;

copolymer containing 77.9 wt % of ethylene and 22.1 wt % of 1-butene (NMR analysis) a hardness of 85 Shore A points and a density of 0.88 g/ml. It is commercialised by Exxon Chemical with the trademark Exact 4033;

ethylene-methyl acrylate copolymers containing 20 wt % of methyl-acrylate units. It has a MFR ratio of 2 g/10 min and density of 0.942 g/ml It is marketed by Chevron Chemical Company with the trademark EMAC SP 2205;

styrene-isoprene-styrene block copolymers (SIS) having a hardness of 34 Shore A points. It is marketed by Shell with the trademark Kraton D-1112;

styrene-ethylene-butylene-styrene block copolymers (SEBS) having a hardness of 75 Shore A points. It is marketed by Shell with the trademark Kraton G-1652;

styrene-ethylene-butylene-styrene block copolymers (SEBS) having a hardness of 65 Shore A points. It is marketed by Shell with the trademark Kraton G-1657;

pentaerithryl-tetrakis[3(3,5-di-tert-butyl-4-hydroxyphenyl] propionate marketed by Ciba-Geigy with the trademark Irganox 1010;

bis (2,4-di-tert-butylphenyl)phosphite marketed by Ciba-Geigy with the trademark Irgafos 168;

Irganox B 225: 50 wt % of Irganox 1010+50 wt % of Irgafos 168;

2,2'-tiodiethyl bis 3(3,5-di-tert-butil-4-hydroxyphenil) propionate marketed by Ciba-Geigy with the trademark Irganox 1035;

bis (2,2,6,6-tetramethyl-4-piperidyl)sebacate marketed by Ciba-Geigy with the trademark Tinuvin 770;

2,5-bis(tert-butylperoxy)-2,5-dimethylhexane marketed by Akzo Nobel with the trademark Trigonox 101;

trans-polyoctenamer rubber having an average molecular weight of 1.0·10⁵, a cis/trans double bond ratio equal to 80:20, commercialised by Hüls AG with the trademark Vestenamer 8012.

Example 1

1st stage: 99.4 parts by weight of heterophasic composition (I), 0.1 parts by weight of Irganox 1010, 0.1 parts by weight of Irgafos 168, 0.08 parts by weight of Trigonox 101, 0.05 parts by weight of calcium stearate and 0.25 parts by weight of Tinuvin 770 were extruded in a twin-screw Maris type extruder (L/D=33 and the diameter is 45 mm) operating at a velocity of 250 rpm and at a temperature ranging from 210°–260° C.

The composition thus obtained has MFR of 16 g/10 min.

2nd stage: 88.4 parts by weight of composition coming from 1st stage, 10 parts by weight of Engage 8200 and about 1.6 parts by weight of pigments were extruded again in the same apparatus and under the same conditions of 1st stage.

The final composition has a MFR of 15.6 g/10 min. In Table 1 are shown the hardness, stickiness, blooming, gloss, planarity and roughness of the final composition and in Table 2 the COF.

Example 2

The 1st stage of example 1 is repeated with the only exception that Tinuvin 770 was absent.

The composition thus obtained has a MFR of 14.6 g/10 min.

2nd stage: 88.1 parts by weight of composition coming from 1st stage, 10 parts by weight of EMAC SP 2205, 0.25 parts by weight of Tinuvin 770 and about 1.6 parts by of pigments were extruded again in the same apparatus and the same conditions of 1st stage.

The final composition has a MFR of 13 g/10 min. In Table 1 are shown the hardness, stickiness, blooming, gloss, planarity and roughness of the final composition and in Table 2 the COF.

Example 3

The 1st stage of example 2 was repeated.

The composition thus obtained has a MFR of 15 g/10 min. The 2nd stage of example 2 was repeated with the exception that 10 parts by weight of Kraton D-1112 in the place of EMAC SP 2205 was mixed to the composition coming from 1st stage.

The final composition thus obtained has a MFR of 14.7 g/10 min. In Table 1 are shown the hardness, stickiness, blooming, gloss and roughness of the final composition and in Table 2 the COF.

Example 4

The 1st stage of example 2 was repeated.

The composition thus obtained has a MFR of 10.4 g/10 min. The 2nd stage of example 2 was repeated with the exception that 10 parts by weight of Exact 4033 in the place of EMAC SP 2205 were mixed to the composition coming from 1st stage.

The final composition thus obtained has a MFR of 8.1 g/10 min. In Table 1 are shown the hardness, stickiness, blooming and gloss of the final composition.

Comparative Example 1c

In the same apparatus and under the same conditions of step 10 of example 1 were extruded 95.8 parts by weight of heterophasic copolymer (I), 3 parts by weight of Vestenamer 8012, 0.18 parts by weight of Trigonox 101, 0.5 parts by weight of Irganox 1035 and 0.25 parts by weight of Tinuvin 770.

The final composition thus obtained has a MFR of 14.5 g/10 min. In Table 1 are shown the hardness, stickiness, blooming, gloss, planarity and roughness of the final composition and in Table 2 the COF.

Comparative Example 2c

The composition as obtained after 1st stage of example 1 was tested. The results are shown in Tables 1 and 2.

Example 5

1st stage: 99.46 parts by weight of heterophasic composition (I) and 0.04 parts by weight of Trigonox 101 were extruded in the same apparatus and the same conditions of 1st stage of example 1.

The composition thus obtained, composition (I'), has a MFR of 8 g/10 min.

2nd stage: 50 parts by weight of the composition coming from the 1st stage, 49.9 parts by weight of Engage 8200 and 0.1 parts by weight of Irganox B 215 were extruded again in the same apparatus and under the same conditions of 1st stage.

The properties of composition (I), (I') and the final composition are shown in Table 3.

Example 6

Example 5 had been repeated with the exception that 70 parts by weight of composition (I) and 29.9 parts by weight of Engage 8200 were used in the 2nd stage.

The properties of the final composition are shown in Table 3.

Example 7

70 parts by weight of heterophasic composition (I), 29.9 parts by weight of Engage 8150 and 0.1 parts by weight of Irganox B 215 were extruded in the same apparatus and under the same conditions of 1st stage of example 1.

The properties of the final composition are shown in Table 3.

Example 8

50 parts by weight of heterophasic composition (I), 49.9 parts by weight of Engage 8150 and 0.1 parts by weight of Irganox B 215 were extruded in the same apparatus and under the same conditions of 1st stage of example 1.

The properties of the final composition are shown in Table 3.

TABLE 1

| Examples | Hardness Shore D[1] | Stickiness[2] | Blooming[3] | Gloss[4] (%) | Gloss[5] (%) | Planarity[6] (μm) 220° C. | Planarity[6] (μm) 260° C. | Roughness (μm) 220° C. | Roughness (μm) 260° C. |
|---|---|---|---|---|---|---|---|---|---|
| 1 | 24 | 1–2 | no | 83.3 | 29.9 | 123–121 | 122–122 | 82–79 | 81–78 |
| 2 | 24.5 | 1–2 | no | 82.6 | 22.6 | 134–167 | 137–148 | 78–81 | 79–81 |
| 3 | 27 | 2–3 | no | 77 | 21 | 200–177 | 156–130 | 85–81 | 86–82 |
| 4 | 29 | 2 | low | 82 | 23 | — | — | — | — |
| 1c | 30–32 | 3 | yes | 83 | 73 | 167–154 | 126–125 | 86–83 | 85–81 |
| 2c | 32 | 3 | yes | 80 | 10 | 127–130 | 167–198 | 84–80 | |

[1] points;
[2] 1 no sticky, 2 low sticky, 3 sticky;
[3] on an extruded band after 6 months at room temperature;
[4] immediately after the moulding;
[5] after 30 days' ageing at 70° C.;
[6] as reference a completely planar metal plaque having a roughness of 120 μm is used, values higher than 120 μm mean a distortion.

TABLE 2

| Ex and comp. | COF[1] before ageing | COF[1] after ageing[2] | COF[3] before ageing | COF[3] after ageing[2] |
|---|---|---|---|---|
| 1 | 0.51 | 0.58 | 0.63 | 1.06 |
| 2 | 0.94 | 1.34 | 1.1 | 1.9 |
| 4 | 1.0 | 1.7 | 1.1 | 1.4 |
| 1c | 0.47 | 0.88 | 0.45 | 0.72 |
| 2c | 0.64 | 1.32 | 0.6 | 1.4 |

[1] plaque moulding at 220° C.;
[2] 3 days' ageing in an oven at 100° C.;
[3] plaque moulding at 260° C.

TABLE 3

| | Examples and comp. examples | | | | | |
|---|---|---|---|---|---|---|
| | 5 | 6 | 7 | 8 | Comp (I)[1] | Comp[2] (I') |
| MFR[3] (g/10 min) | 7.5 | 6.8 | 0.81 | 0.89 | 0.6 | 8 |
| Hardness Shore D (points) | 23 | 27 | 28 | 26 | 32 | 32 |
| Hardness Shore A (5") (points) | 79 | 83 | 81 | 79 | 90 | 90 |
| Tensile at break (MPa) | 14.5 | 17 | 8.8 | 7.7 | 22 | 19 |
| Elongation at break (%) | 1160 | 1180 | 650 | 490 | 800 | 900 |
| Tension set 100% at 23° C. (%) | 26 | 32 | 30 | 22 | 40 | 38 |

[1] heterophasic composition (I);
[2] the composition is obtained in stage 1 of example 5;
[3] 230° C., 2.16 kg.

What is claimed is:

1. An elastomeric thermoplastic polyolefin composition comprising (percent by weight):
   (I) 40–97% of a heterophasic olefin polymer composition comprising:
      (A) 5–50% of a crystalline propylene homopolymer with isotactic index greater than 80% or crystalline copolymer of propylene and ethylene or a $CH_2$=CHR α-olefin, wherein R is a $C_2$–$C_8$ alkyl radical, or crystalline copolymer of propylene, ethylene and a $CH_2$=CHR α-olefin, wherein R is a $C_2$–$C_8$ alkyl radical, or blend thereof; said copolymers containing more than 85% of propylene and having an isotactic index greater than 80%;
      (B) 0–20% of a crystalline copolymer of ethylene with propylene or with a $CH_2$=CHR α-olefin, wherein R is a $C_2$–$C_8$ alkyl radical, or both propylene and said alpha-olefin; the ethylene content being at least 75 wt %, said crystalline copolymer being insoluble in xylene at ambient temperature; and
      (C) 50–95% of an elastomeric copolymer of ethylene with propylene or with a $CH_2$=CHR α-olefin, wherein R is a $C_2$–$C_8$ alkyl radical, or both propylene and said alpha-olefin, and optionally with minor amounts of a diene, said elastomeric copolymer containing ethylene in an amount smaller than 40% and being soluble in xylene at ambient temperature; and
   (II) 3–60% of an elastomeric polymer having a hardness (Shore A, ASTM D-2240) equal to or less than 90 points selected from the group consisting of:
      (i) copolymers of ethylene with a $C_3$–$C_{10}$ α-olefin containing at least 20 wt % of $C_3$–$C_{10}$ α-olefin ($^{13}$C-NMR analysis) and having a Mw/Mn ratio less than 4;
      (ii) ethylene-methyl acrylate copolymers containing from 15 to 30 wt % of methyl acrylate units and having MFR from 1 to 10 g/10 min (ASTM D-1238); and
      (iii) saturated or unsaturated styrene block copolymers, linear or branched, containing at least one comonomer selected from butadiene, butylene, ethylene and isoprene.

2. The composition of claim 1 wherein elastomeric copolymer (II) is selected from the group consisting of elastomeric copolymers of:
   (a) elastomeric copolymers of ethylene with 1-octene having from 20 wt % to 40 wt % of 1-octene ($^{13}$C-NMR analysis);
   (b) elastomeric thermoplastic copolymers of ethylene with 1-butene having from 20 wt % to 40 wt % of 1-butene ($^{13}$C-NMR analysis);
   (c) ethylene-methyl acrylate copolymers containing about 20–25 wt % of methyl acrylate units and having MFR from 1.5 to 6 g/10 min; and
   (d) unsaturated linear block copolymers of styrene with isoprene or butadiene and saturated linear block copolymers of styrene with ethylene and butylene.

3. The composition of claim 1 wherein heterophasic olefin polymer composition (I) comprises from 10 to 40 wt % of component (A), from 0 to 15 wt % of component (B) and from 50 to 75 wt % of component (C).

4. The composition of claim 1 wherein elastomeric copolymer (II) is a copolymer containing 66 wt % of ethylene and 34 wt % of 1-octene ($^{13}$C-NMR analysis), having a hardness of 75 Shore A points (according to ASTM D-2240), MFR of 10 g/10 min (according to ASTM D 1238, condition L) and a density of 0.87 g/ml according to method ASTM D 792.

5. A method for producing an article of manufacture by injecting, co-injecting moulding or sequential injection moulding the composition of claim 1 to produce the article of manufacture.

6. A method for producing an article of manufacture by extruding the composition of claim 1 to produce the article of manufacture.

7. A method for producing an article of manufacture by blow moulding the composition of claim 1 to produce the article of manufacture.

8. A shaped manufactured article of the composition of claim 1.

9. Films and laminates made of the composition as claimed in claims 1–4.

* * * * *

UNITED STATES PATENT AND TRADEMARK OFFICE
CERTIFICATE OF CORRECTION

PATENT NO. : 6,696,520 B1  
APPLICATION NO. : 09/172959  
DATED : February 24, 2004  
INVENTOR(S) : Giampaolo Pellegatti, Vittorio Braga and Roberto Bonari It is certified that error appears in the above-identified patent and that said Letters Patent is hereby corrected as shown below:

Title Page

In the Assignee (73) section, please change:

"Basell Poliolefine Italia S.p.A." to --Basell Technology Company BV--.

Signed and Sealed this

Fourteenth Day of October, 2008

JON W. DUDAS  
*Director of the United States Patent and Trademark Office*